Patented Apr. 13, 1937

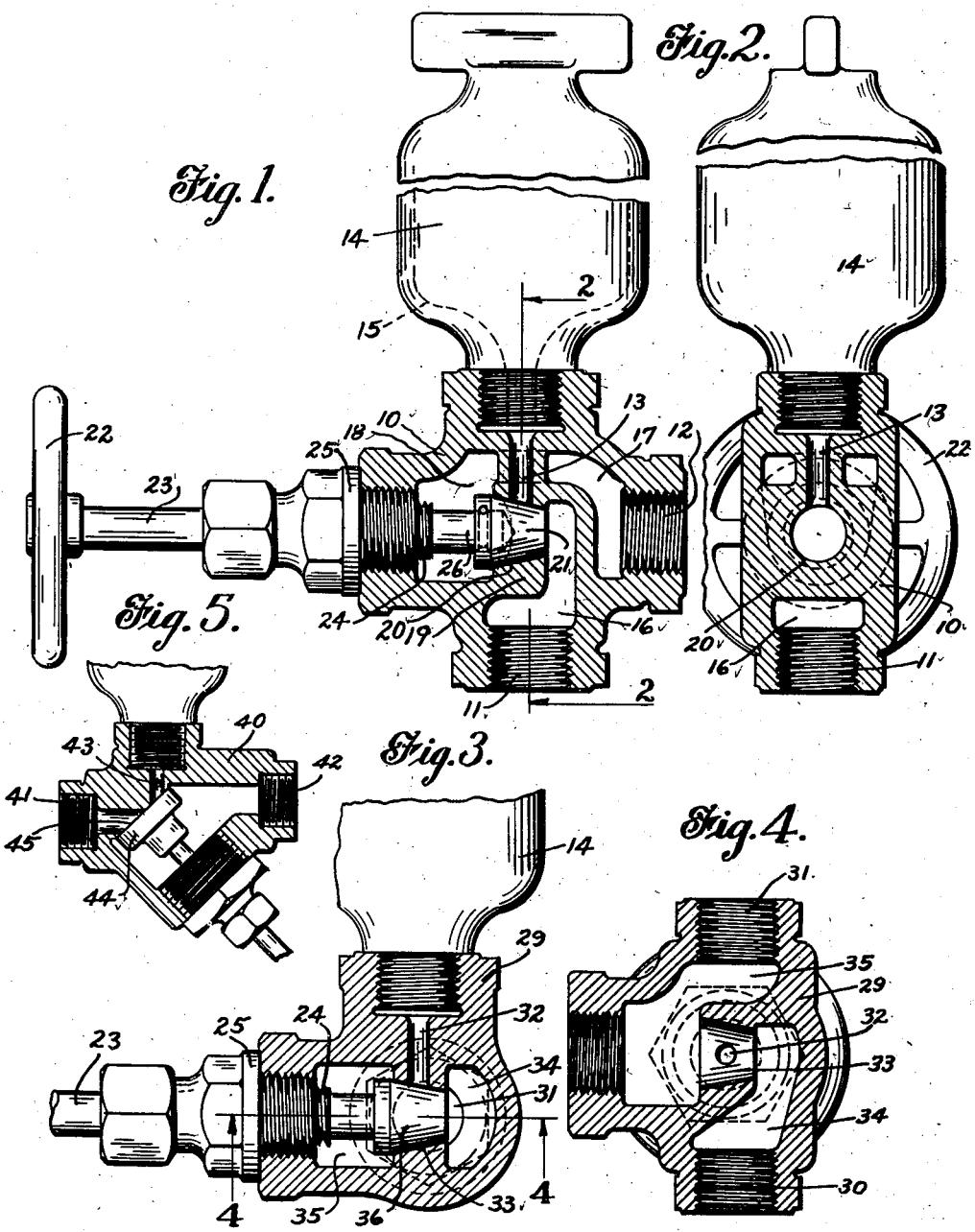

2,077,191

UNITED STATES PATENT OFFICE 2,077,191

PRESSURE VALVE AND OILER

Frank L. Staley, Branford, Conn., assignor to Etta F. Dow, Branford, Conn.

Application June 15, 1934, Serial No. 730,708

4 Claims. (Cl. 184—55)

This invention relates to comparatively high pressure valves and more particularly to a combined pressure valve and oiler for use in systems wherein compressed air, or the like, is used to operate a mechanism which requires constant lubrication during its operation. While valves that control both lubricant supply port and a fluid pressure port have been previously provided they have not proved to be as efficient as is required, for instance, where a compressed fluid is used to operate mechanism requiring constant lubrication, such as a piston and cylinder mechanism. In many instances, these valves supply either too much, too little, or no lubricant at all while permitting the compressed fluid to pass and operate the mechanism.

The principal object of this invention, therefore, is to provide a combined valve and oiler which will be efficient in use, readily operable, comparatively inexpensive to manufacture, and in the operation of which the above disadvantages, and others, will not be encountered.

Another object is to provide a combined pressure valve and oiler wherein the flow of the pressure fluid and lubricant will be substantially proportional at any open position, thereby insuring sufficient lubrication for the device operated by the pressure fluid during all speed variations of its operation.

Still another object is to provide in a combined pressure valve and oiler, mechanism to positively and simultaneously open the inlet ports of both the pressure fluid and the lubricant.

A still further object is to provide in such a valve, novel structure whereby the flow of pressure fluid through the valve will be in such a direction in respect to the direction of possible flow of the lubricant that the lubricant or oil will be drawn along thereby and mixed therewith.

A still further object is to provide in such a valve an axially movable valve member which will substantially simultaneously open or close a lubricant port disposed at substantially right angles to, and a passageway the axis of which is substantially in alignment with, the direction of movement of said valve member.

To these and other ends, the invention consists in the novel features and combinations of parts to be hereinafter described and claimed.

In the accompanying drawing:

Fig. 1 is a side view partially in section of a pressure valve and oiler, embodying the features of this invention;

Fig. 2 is a section of the same on line 2—2 of Fig. 1;

Fig. 3 is a sectional view through a valve of somewhat modified form, also embodying the features of this invention;

Fig. 4 is a section on line 4—4 of Fig. 3, and

Fig. 5 is a section of still another form of valve in the structure of which the features of this invention are present.

The pressure valve and oiler illustrated in Figs. 1 and 2, generally comprises a valve casing 10, having an inlet port 11, an outlet port 12, and a lubricant port 13 formed therein, and a lubricant container 14, the interior 15 of which is in communication with the lubricant port 13. The inlet port 11 communicates directly with a chamber 16, and the outlet port 12 is in communication with a chamber 18 by means of a passageway 17. In this instance, the inlet and outlet ports 11 and 12 respectively, are disposed at right angles to each other. The chambers 16 and 18 are separated by a wall 19 in which is formed a passageway 20 connecting the aforesaid chambers 16 and 18.

The walls of passageway 20, in this instance, form a cone valve seat in which a cone valve member 21 may be seated and unseated by operation of a usual form of valve member operating mechanism, which generally comprises a handle 22, secured to a rotatable stem 23, which by means of a threaded portion 24, cooperating with corresponding threads formed in a part 25, moves the valve member 21 axially in either direction upon being rotated, the valve member 21 in this instance being rotatably secured to the inner end 26 of stem 23. In this instance, the small diameter of the cone shape of both the valve member and passageway 20, is disposed adjacent the chamber 16.

The lubricant port 13 is in communication with the passageway 20, being directed into the same substantially at right angles to the axis thereof. Due to its position in respect to the passageway 20, the port 13 is closed when the valve member 21 is seated against the wall of passageway 20, to close the same, and it will be obvious that the closing action of member 21 upon both the passageway 20 and port 13, takes place substantially simultaneously. In consequence of the above structure, movement of valve member 21 to unseat it from the wall of passageway 20 even the slightest amount will permit fluid under pressure in chamber 16 to flow over the surface of member 21, through passageway 20 and past port 13, which being also slightly opened, will permit lubricant to be released and drawn along by the rapid flow of pressure fluid and to mix therewith.

In Figs. 3 and 4, a casing 29 is provided with inlet and outlet ports 30 and 31 respectively, which are disposed substantially in alignment. A lubricant port 32 is disposed at right angles to the axes of ports 30 and 31 as well as at right angles to the axis of a cone-shaped passageway 33, connecting chambers 34 and 35 that are respectively in communication with ports 30 and 31. In this embodiment, as in the one shown in Figs. 1 and 2, lubricant port 32 is opened substantially simultaneously with passageway 33 by movement of a valve member 36, in a direction at right angles to the port 32 and axially in respect to passageway 33, whereby the action of the flow of pressure fluid past port 32 will draw lubricant therefrom.

In both the embodiment shown in Figs. 1 and 2 and Figs. 3 and 4, the volume of pressure fluid permitted to flow by opening movement of the respective valve member, will be substantially proportional to the volume of lubricant permitted to be drawn from the respective lubricant ports and any mechanism operated by the pressure fluid will obtain sufficient lubrication during its operation. It will be understood that as the flow of pressure fluid is gradually increased by gradual opening of the valve there will be a corresponding gradual increase in speed of the mechanism being operated, whereby a larger and proportional amount of lubricant will be required. By the use of the valve and oiler structure of this invention it will be obvious that a proper amount of lubricant will be furnished at all speeds of the operated mechanism and that this lubricant will be positively provided as soon as pressure fluid starts to flow through the valve toward said mechanism and continues without possibility of interruption until such pressure fluid is shut off.

Fig. 5 illustrates the adaptation of the features of this invention to a flat seat type of valve. In this embodiment the flow of pressure fluid is substantially straight through the valve casing 40, from an inlet port 41 to an outlet port 42, and passes the lubricant port 43 when valve member 44 is moved axially away from its seat 45. Both ports 43 and 41 are opened substantially simultaneously by axial movement of valve member 44, and the amount of opening of both will, as in the subsequently described embodiments, be substantially proportional.

While I have shown and described a preferred embodiment of my invention, it will be understood that it is not to be limited to all of the details shown, but is capable of modification and variation within the spirit of the invention and the scope of the appended claims.

What I claim is:

1. In a combined valve and oiler, a vertically disposed oil container, a valve casing, said valve casing having a pair of fluid receiving chambers formed therein, an inlet port connected to one of said fluid chambers, an outlet port connected to the other of said fluid chambers, a vertically disposed wall separating said chambers, a fluid passageway leading through said wall at substantially right angles thereto and connecting said chambers, a port connected to the bottom of said oil container, an oil passageway in said wall connecting said last named port with said fluid passageway leading through said wall, an axially movable valve member in said fluid passageway, and means to actuate said valve member to open and close both of said passageways.

2. In a combined valve and oiler, a vertically disposed oil container, a hollow valve casing, said valve casing having a vertically disposed wall therein separating its interior into a pair of fluid receiving chambers, an inlet port connected to one of said chambers, an outlet port connected to the other of said chambers, a cone shaped passageway extending at right angles to and through said wall to connect said chambers, a port formed in said casing, co-operating means to secure the bottom of said oil container to said casing in connection with said last mentioned port, a passageway extending through said wall and connecting said last mentioned port with said cone shaped passageway intermediate the ends of the latter, a cone shaped valve member adapted to seat in and substantially fill said cone shaped passageway to close the same and said last mentioned passageway, and means passing through one of said chambers to actuate said valve.

3. In a combined valve and oiler, a vertically disposed oil container having an outlet in its bottom, a valve casing to which said container is secured and having a vertical wall separating said casing into chambers and an inlet and an outlet port communicating with the chambers respectively, an opening forming a valve seat in said wall connecting said chambers, an axially reciprocable valve arranged for movement at right angles to said wall to engage said seat to close the opening in said wall, said wall having a vertically disposed opening therein connecting said oil container outlet with the valve seat opening in said wall.

4. In a combined valve and oiler, an oil container having an outlet, a valve casing to which said container is secured and having a wall substantially in alignment with the outlet in said oil container separating said casing into chambers, and an inlet and an outlet communicating with the chambers respectively, an opening forming a valve seat in said wall connecting said chambers, an axially reciprocable valve arranged for movement substantially at right angles to said wall to engage said seat to close the opening in said wall, said wall having an opening therein in alignment with the outlet in said oil container to connect the same with the valve seat opening in said wall.

FRANK L. STALEY.